United States Patent
Rabin

(10) Patent No.: US 12,514,934 B2
(45) Date of Patent: Jan. 6, 2026

(54) METHOD AND DEVICE FOR EVALUATING HAIR GROWTH TREATMENTS

(71) Applicant: Transdermal Cap, Inc., Gates Mills, OH (US)

(72) Inventor: Michael I. Rabin, Gates Mills, OH (US)

(73) Assignee: Transdermal Cap, Inc., Gates Mills, OH (US)

( * ) Notice: Subject to any disclaimer, the term of this patent is extended or adjusted under 35 U.S.C. 154(b) by 818 days.

(21) Appl. No.: 17/758,148

(22) PCT Filed: Jan. 11, 2021

(86) PCT No.: PCT/US2021/013001
§ 371 (c)(1),
(2) Date: Jun. 29, 2022

(87) PCT Pub. No.: WO2021/142467
PCT Pub. Date: Jul. 15, 2021

(65) Prior Publication Data
US 2023/0024843 A1 Jan. 26, 2023

Related U.S. Application Data

(60) Provisional application No. 62/959,852, filed on Jan. 10, 2020.

(51) Int. Cl.
*A61B 5/107* (2006.01)
*A61K 49/00* (2006.01)
*G01N 21/64* (2006.01)

(52) U.S. Cl.
CPC ..... *A61K 49/0004* (2013.01); *G01N 21/6428* (2013.01); *G01N 2021/6439* (2013.01)

(58) Field of Classification Search
CPC .......... A61B 5/10; A61B 5/1025; A61B 5/107
See application file for complete search history.

(56) References Cited

U.S. PATENT DOCUMENTS

| | | | |
|---|---|---|---|
| 6,389,150 B1 * | 5/2002 | Amornsiripanitch ....................... A61B 5/1072 382/128 |
| 2004/0092917 A1 | 5/2004 | Jay | |
| 2004/0201694 A1 * | 10/2004 | Gartstein ............. A61B 5/1072 348/207.99 |
| 2011/0087310 A1 | 4/2011 | Chen et al. | |
| 2012/0046873 A1 * | 2/2012 | Rabin .................... G16H 20/00 702/19 |
| 2012/0148127 A1 | 6/2012 | Rassman et al. | |
| 2013/0174285 A1 | 7/2013 | Imamura et al. | |
| 2018/0184968 A1 | 7/2018 | Kasprzak | |
| 2018/0192764 A1 | 7/2018 | Miklatzky et al. | |

OTHER PUBLICATIONS

International Search Report and Written Opinion for corresponding PCT application PCT/2021/13001 mailed on Apr. 1, 2021.

* cited by examiner

*Primary Examiner* — Micah Paul Young
(74) *Attorney, Agent, or Firm* — Renner, Otto, Boisselle & Sklar, LLP

(57) ABSTRACT

A method and device are provided for evaluating hair growth treatments by applying markers to a hair area at different times to measure pre-treatment hair volume and post-treatment hair volume. By comparing changes in hair volume within one or more hairs, an effectiveness of the hair regrowth treatment can be measured.

20 Claims, 4 Drawing Sheets

METHOD AND DEVICE FOR EVALUATING HAIR GROWTH TREATMENTS

RELATED APPLICATIONS

This application claims the benefit of 62/959,852 filed on Jan. 10, 2020 and PCT/US2021/013001 file on Jan. 11, 2021. Which are both herein incorporated by reference in their entirety.

TECHNICAL FIELD

The present disclosure relates generally to hair loss treatment and more particularly to the analysis of hair shaft growth.

BACKGROUND

Hair loss affects millions (up to 50% of women and 80% of men) and expenditures for treatments are in the billions per annum. Medical treatments include photomedicine and certain topical and/or oral pharma agents, along with some specific supplements that have been reported to have a positive effect on hair follicle health and thus hair growth. More recently, regenerative medicine in the form of platelet rich plasma, stem cell, and other related in-office treatments are being used effectively.

Assessing efficacy in response to these treatments can be quite challenging to measure but it is important to provide clinical efficacy feedback to the physician and patient as the physician may want to add or change the treatment protocols and patients need the feedback to support compliance and/or support changes in the treatment protocols. Some physicians utilize gross and/or micro photography to demonstrate progress but many times this is not objective. Others use hair density measures such as haircheck but these techniques may only be utilized in an office setting and require staff training, and significant time for each assessment. Hair counting is only used in clinical trials; this method basically looks for conversion of thin vellus hairs (e.g., <=40 μm and not counted) to thicker hairs (>40 μm and thus counted) in a treatment area. Furthermore, this requires shaving an area of interest, photographing it, treating for many weeks and then a repeat of the shave-photo steps. None of these measurement solutions are practical for the hair loss masses seeking to start and stick with their treatments.

SUMMARY

To effectively measure hair regrowth response to treatment, one must zero in on the parameters to be measured. For example, the most common form of hair loss, pattern hair loss or androgenetic alopecia, results in thinner diameter hairs, reduced pigmentation, and reduced anagen phase (i.e., results in shorter hair length) with each successive hair growth cycle. Average rates of hair growth have been expressed, however, individual patient hair growth rates are generally unknown, and may vary within the anagen phase and may vary (e.g., may decrease) with each successive hair growth cycle in patients with pattern hair loss. Effective treatments are thought to stabilize or increase hair thickness possibly intra-anagen (i.e., while a hair is growing) and certainly inter-anagen (from one hair growth phase to the next). In addition, effective treatments will keep the hair follicle in anagen longer, and may increase pigmentation with each successive hair cycle, under treatment. It is not known what effect treatments may have on hair growth rate.

In an exemplary embodiment, the present disclosure provides a method for evaluating hair growth treatments by applying markers to a hair area at different times to measure pre-treatment hair volume and post-treatment hair volume.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
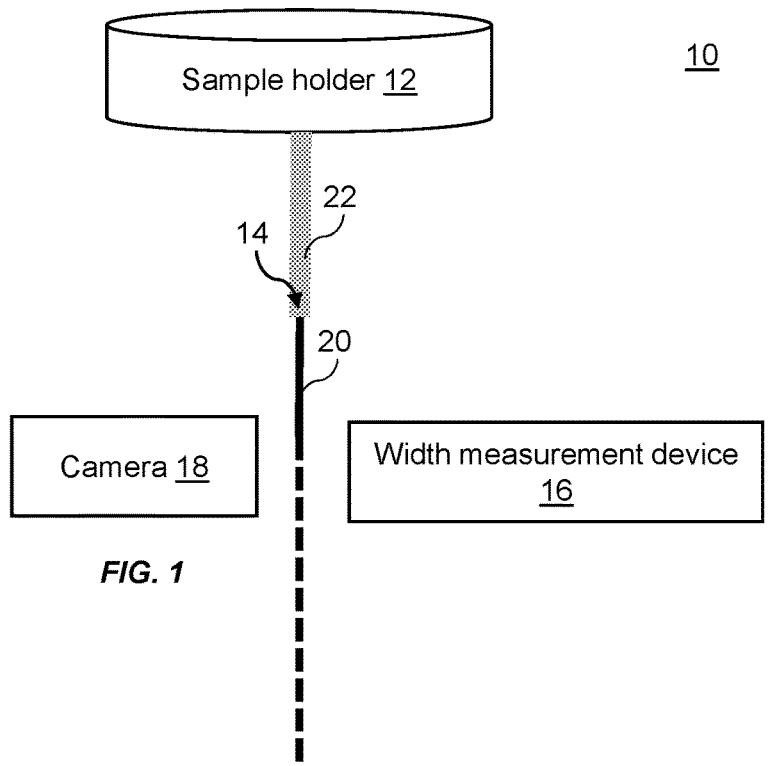
FIG. 1 is a block diagram of an exemplary embodiment of a hair measurement device.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

According to a general embodiment, a method and device are provided for evaluating hair growth treatments by applying markers to a hair area at different times to measure pre-treatment hair volume and post-treatment hair volume. By comparing changes in hair volume within one or more hairs, an effectiveness of the hair regrowth treatment can be measured.

In the exemplary embodiment shown in FIG. 1, a hair measurement device 10 is shown for evaluating hair growth treatments. The device 10 includes a sample holder 12 for receiving a hair sample 14, a width measurement device 16, and a camera 18. The sample holder 12 maintains a position of the hair sample 14 relative to the width measurement device 16 and the camera 18. The camera 18 detects a first portion of the hair sample as pre-treated hair 20 and a second portion of the hair sample as post-treated hair 22. The width measurement device 16 measures and outputs a pre-treatment hair volume and a post-treatment hair volume.

Figure 2:
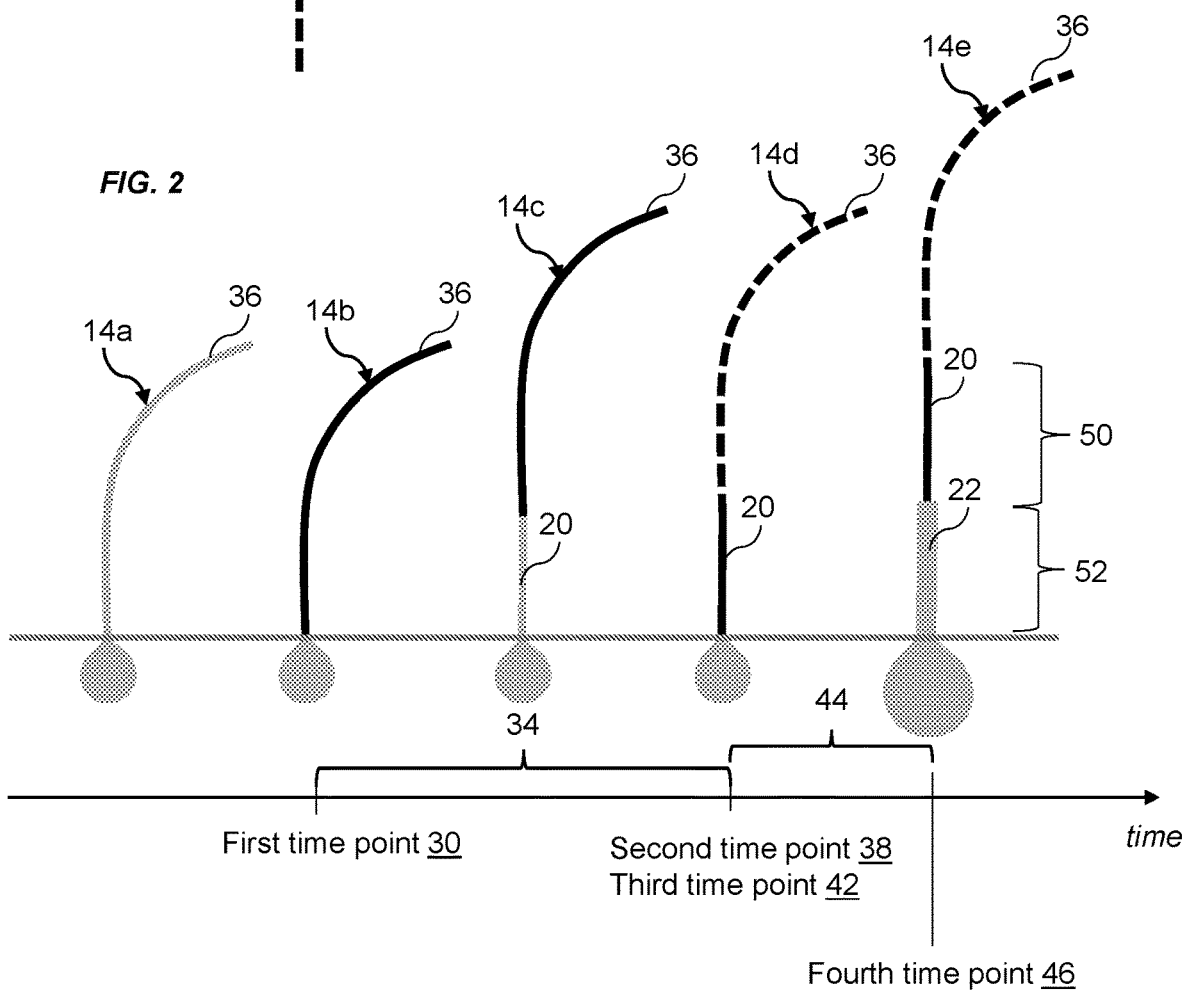
FIG. 2 is a schematic diagram of an exemplary hair sample at various time points.

In the embodiment shown in FIG. 2, a timeline of treatment of an exemplary hair sample 14 is shown. The hair sample 14a before marking is shown on the far left of the image. At the first time point 30, the hair sample 14b was marked using a first marker 32. During a first duration of time 34 following the first time point 30, the hair sample 14 has grown, resulting in pre-treated hair 20 that is not marked and original hair 36 that has been marked using the first marker 32. At the second time point 38, the hair sample 14d was then marked using a second marker 40. At the third time point 42, the hair sample 14d was treated with a hair growth treatment. In FIG. 2, the third time point 42 immediately follows the second time point 38. By placing the second time point 38 and the third time point 42 at the same time (or close to one another in time), it is know that hair growth occurring after application of the second marker 40 occurs after the hair treatment has been applied. During a second duration of time 44 following the second time point 38, the hair sample 14e grows, resulting in post-treated hair 22. At a fourth time point 46, the hair sample 14e is collected.

As described above, the camera 18 is positioned to image the hair sample 14 retained by the sample holder 12. The camera 18 detects as the pre-treated hair 20 the portion of the hair sample 14 that is marked with the second marker 40 and that is not marked with the first marker 32. The camera 18 also measures a growth of the pre-treated hair 20 as a length 50 of the pre-treated hair 20.

The camera 18 additionally detects as the post-treated hair 22 the second portion of the hair sample 14 that is not marked with the first marker 32 and that is not marked with the second marker 40. The camera 18 measures a growth of the post-treated hair 22 as a length 52 of the post-treated hair 22.

The wavelength measuring device 16 measures hair volume of the received hair sample 14 measures as a pre-treatment hair volume a cross section of the pre-treated hair 22. The wavelength measuring device 16 also measures as a post-treatment hair volume a cross section of the post-treated hair 22. The wavelength measuring device 16 outputs the measured hair volume including the pre-treatment hair volume and the post-treatment hair volume. The wavelength measuring device 16 may also measure a pigmentation of the pre-treated hair and the post-treated hair.

Figure 3:
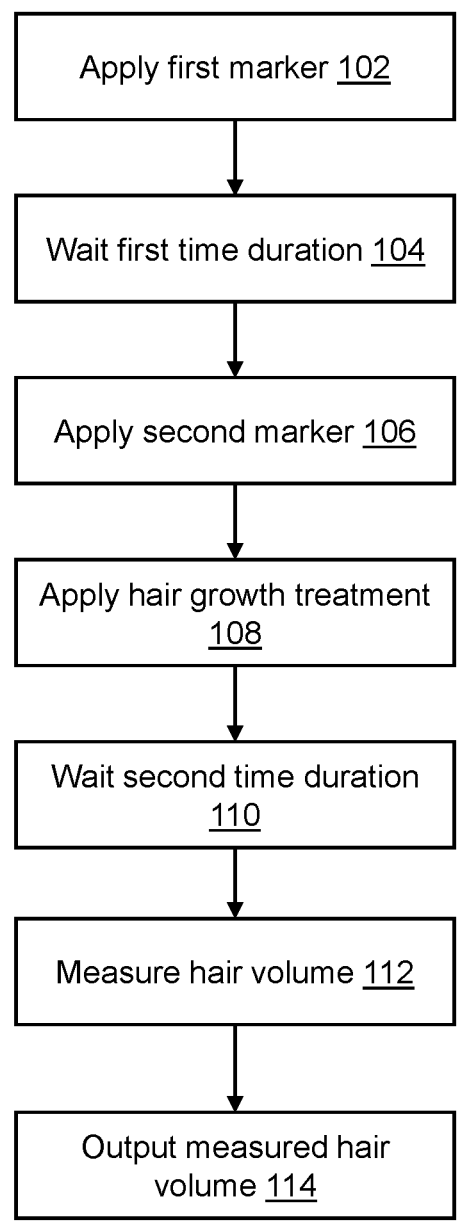
FIG. 3 is a flow diagram of an exemplary method for measuring hair volume.

In FIG. 3, an exemplary method 100 for evaluating hair growth treatments is shown. In process block 102, the first marker 32 is applied to the hair area at the first time point 30. In process block 104, a first duration of time 34 is waited. In process block 106, the second marker 40 is applied to the hair area at the second time point 38. In process block 108, a hair growth treatment is applied to the hair area at a third time point 38. In process block 110, a second duration of time 44 is waited. In process block 112, the hair volume of the hair area is measured at the fourth time point 46. For example, the method may include removing a strand of hair from the hair area As described above, measuring the hair volume includes measuring the volume of the pre-treated hair 20 (referred to as the pre-treatment hair volume) and measuring the volume of the post-treated hair (referred to as the post-treated hair volume). Measuring the pre-treatment hair volume includes detecting the pre-treated hair 20, measuring a cross section of the pre-treated hair 20, and measuring a growth of the pre-treated. Measuring the post-treatment hair volume includes detecting the post-treated hair, measuring a cross section of the post-treated hair, and measuring a growth of the post-treated hair. In process block 114, the measured hair volume (including the pre-treatment hair volume and the post-treatment hair volume) is output.

As shown in FIG. 2, the second time point 38 may be after the first duration of time 34 following the first time point 30. The fourth time point 46 may similarly be after a second duration of time 44 following the second time point 38. As described above, the second time point 38 and the third time point 42 may occur at a same time so that post-treated hair 22 is distinguishable from the pre-treated hair 20. The second and third time points 38, 42 occurring at the same time may refer to the time points being within hours or a day of one another.

The first time duration and second time duration may be any suitable duration of time. For example, the first time duration 34 and the second time duration 44 may be a same duration of time. The time durations 34, 44 being the same may refer to the time durations 34, 44 being within hours or a day of one another. The first time duration 34 and the second time duration 44 may be greater than three weeks and less than six weeks (e.g., 15-30 days).

Figure 4:
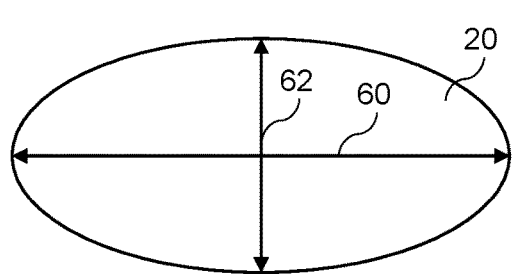
FIG. 4 is a schematic diagram of a cross-section of pre-treated hair.
Figure 5:
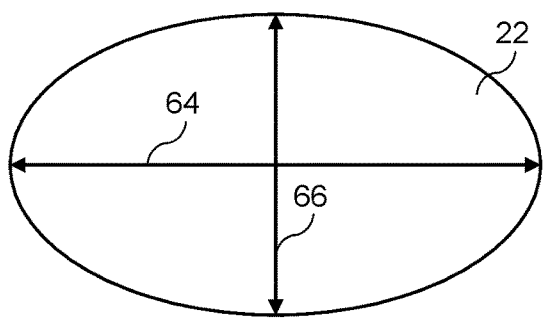
FIG. 5 is a schematic diagram of a cross-section of post-treated hair.

In the embodiments shown in FIGS. 4 and 5, the measured cross section of the pre-treated hair 20 is a long axis 60 and a short axis 62 of the cross section of the pre-treated hair 20. Similarly, the measured cross section of the post-treated hair 20 is a long axis 64 and a short axis 66 of the cross section of the post-treated hair 22. When measuring the cross section of the pre-treated hair 20, the long axis 60 and the short axis 62 of the pre-treated hair 20 may be measured at a plurality of locations along the pre-treated hair. Similarly, when measuring the cross section of the post-treated hair 22, the long axis 64 and the short axis 66 of the post-treated hair 22 may be measured at a plurality of locations along the pre-treated hair 22.

Calculating a hair volume of the pre-treated hair may be based on the length 50 of the pre-treated hair 20 and the long axis 60 and the short axis 62 measurements of the pre-treated hair. Similarly, calculating a hair volume of the post-treated hair 22 may be based on the length 52 of the post-treated hair and the long axis 64 and the short axis 66 measurements of the post-treated hair 22. For example, the long and short axis may be used to calculated a cross sectional area and this cross sectional area may be used with the length to calculate a hair volume.

The measured pre-treatment hair volume may include a growth rate of the pre-treated hair and a growth rate of the post-treated hair. The growth rate of the pre-treated hair may be the length of the pre-treated hair divided by the first time duration. Similarly, the growth rate of the post-treated hair may be the length of the post-treated hair divided by the second time duration.

Figure 6:
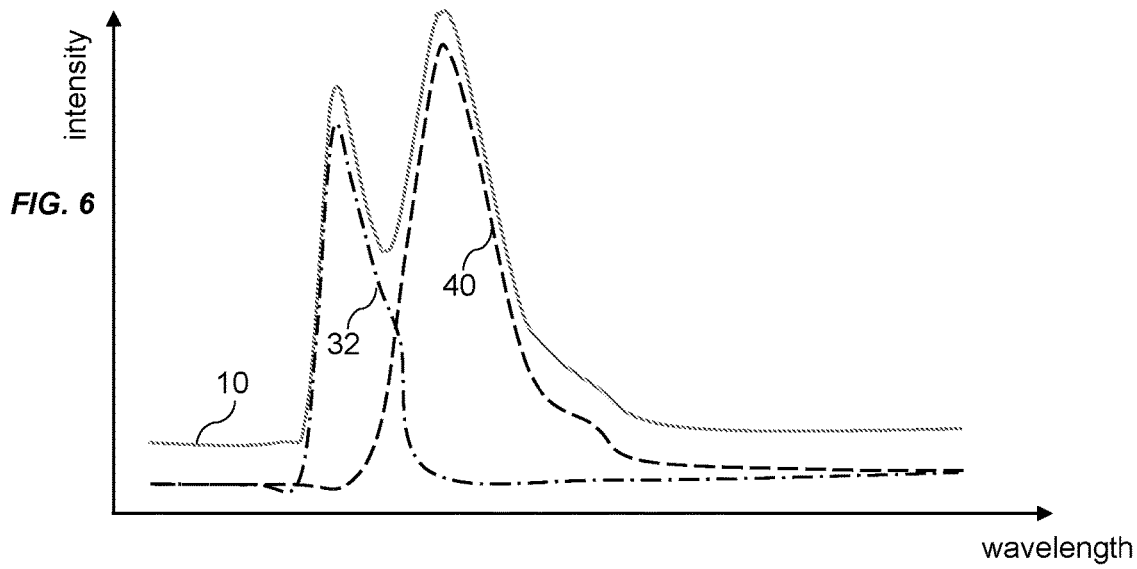
FIG. 6 is a schematic diagram of an exemplary spectrographic measurement of a first marker and a second marker.

The first marker 32 and the second marker 40 may alter a visual property of the hair 14. For example, the first marker 32 and the second marker 40 may alter a pigmentation of the hair or the first marker and the second marker may be fluorescent markers. In FIG. 6, the first marker is a fluorescent marker that absorbs light at 650 nm and emits light at 680 nm and the second marker is a fluorescent marker that also absorbs light at 650 name and emits light at 740 nm. FIG. 6 shows: (1) (using a dashed-dot line) a portion of the hair marked only with the first marker 32; (2) (using a dashed line) a portion of the hair marked only with the second marker 40; and (3) (using the gray solid line) a portion of the hair marked with the first marker 32 and the second marker 40.

Figure 7:
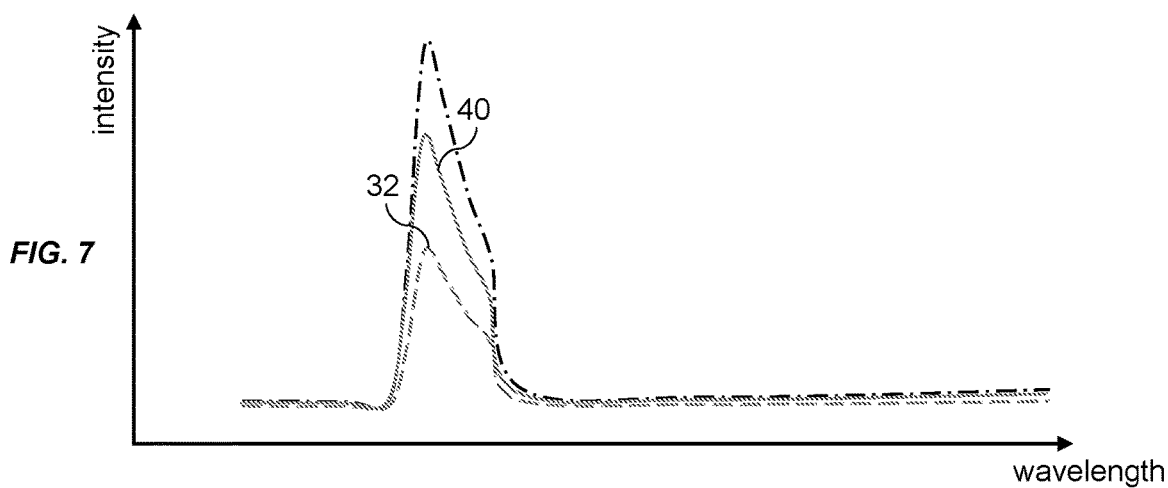
FIG. 7 is a schematic diagram of another exemplary spectrographic measurement of a first marker and a second marker.

In the embodiment shown in FIG. 7, the first 32 and second marker 40 are a same marker. In this example, the intensity of the fluorescent emission by the markers 32, 40 increases with each application. For this reason, the portion of the hair marked only with the first portion is shown with a dashed line; the portion of the hair marked only with the second portion is shown with the solid line; and the portion of the hair marked with both the first marker and the second marker is shown with the dashed-dotted line. In this example, the intensity of the first marker 32 appears less than the intensity of the second marker 40, because the first marker 32 diminished over time.

The first marker 32 and second marker 40 may be any suitable agent that is detectable on the hair of the hair area when hair volume is measured at the fourth time point. In one embodiment, at least one of the first marker or the second marker affect a visible property (e.g., color or sheen) of the hair area. In another embodiment, at least one of the first marker or second marker are not visible. For example, the markers may not alter a visible color of hair, but may instead be detectable by other methods such as photon absorption of particular wavelength with corresponding emission of particular wavelength.

In one embodiment, the first marker and the second marker may be fluorescent dyes that receive an excitation wavelength of light and emit light at a different emission wavelength of light. The markers may be wash fast (i.e., the intensity of the marker in the marked hair may remain constant and not diminish during the first time duration or the second time duration). In one embodiment, the first and second markers comprise size changing molecules that enlarge when oxidized.

The first and second markers may each be added during a hair coloring. For example, the first marker may be mixed in with a hair dye (i.e., used to dope the hair dye) so that the first marker is applied during a hair treatment (e.g., at a hair salon). For example, the hair dye may be a hair coloring or a hair sheen treatment. The first and/or second marker may also be applied during a perm. At least one of the first marker or the second marker may be attached to a hair dye (e.g., covalently bonded).

In one embodiment, the hair dye may react (e.g., chain extend) for some period of time before a marker including maleimide fluorophore is added. The hair coloring process may occur under basic conditions, so the maleimide group will react preferentially with amines. In one embodiment, an amine-reactive or other dye is attached to the color molecular of a hair dye.

Figure 8:
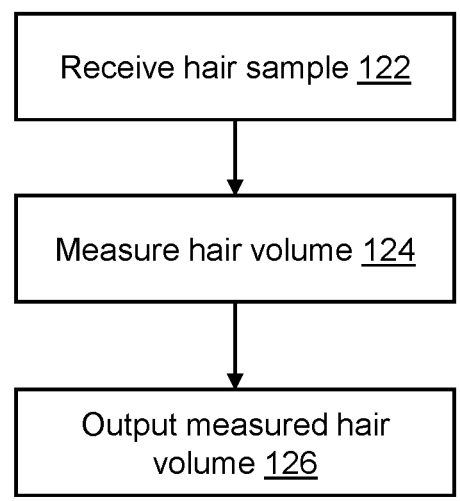
FIG. 8 is a flow diagram of an exemplary method for evaluating hair growth treatments applied to a received hair sample.

In the embodiment shown in FIG. 8, a method 120 for evaluating hair growth treatments applied to a received hair sample is shown. In process block 122, the hair sample 14 is received. In process block 124, the hair volume of the received hair sample 14 is measured. In process block 126, the measured hair volume including the pre-treatment hair volume and the post-treatment hair volume is output.

The hair growth treatment may be any potential therapy or intervention intended to regrow hair. For example, hair regrowth treatment may include finasteride, minoxidil, photomed, regenmed, etc.

The hair area may comprise any area of interest. For example, the hair area may be the entire scalp, a bald spot, the crown of the head, etc. In one embodiment, the hair area is a 10 mm×10 mm area of the scalp and hair samples are taken from a 3 mm×3 mm portion of this hair area. The hair sample be one or more hair follicles removed from (e.g., plucked) the hair area.

It may not be possible to accurately assess response to treatment by individual hair shaft analysis unless the growth rate of a given hair can be determined just prior to and just after application of a therapeutic agent. For example, changes in the proximal end of a cut telogen (i.e., dormant) hair may occur weeks prior to the treatment and it may not be possible to know this (i.e., distinguishing between a result of a recent treatment or a result of something that occurred weeks prior).

In one embodiment, the efficacy of applied therapeutic agents may be evaluated by comparing the hair volume of the pre-treated hair to the post-treated hair. By marking the hair area, it is possible to use each hair sample as its own baseline (i.e., by comparing the pre-treated and post-treated portions of the hair).

The sample holder 12 may be a rotating screw device 12 attached to one end of the hair sample with the other end of the hair sample 14 attached to a miniature weight and hanging by gravity. The width measurement device 16 may be a laser width measuring device or other shape profilometer means positioned to measure the instantaneous hair shaft width transverse to a measuring beam. As the screw turns under motorized control, the hair advances up or down so as to expose cross-sectional selections of the width of the hair as a function of length.

In one embodiment, the camera may be configured to act as the width measurement device. In another embodiment, the camera is included as part of the wavelength measuring device.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method for evaluating hair growth treatments comprising:
   applying a first marker to a hair area at a first time point, such that hair strands in the hair area are detectably marked by the first marker;
   applying a second marker to the hair area at a second time point, such that the hair strands in the hair area are detectably marked by the second marker;

wherein the second time point follows the first time point after a first duration of time:
applying a hair growth treatment to the hair area at a third time point;
measuring hair volume of the hair area at a fourth time point following the second time point after a second duration of time comprising:
  selecting a hair from the hair area,
  measuring a pre-treatment hair volume of pre-treated hair comprising:
    detecting as the pre-treated hair a first portion of the selected hair from the hair area that is marked with the second marker and that is not marked with the first marker;
    measuring a cross section of the pre-treated hair;
    measuring a growth of the pre-treated hair during the first duration of time comprising a length of the pre-treated hair; and
  measuring a post-treatment hair volume of post-treated hair comprising:
    detecting as the post-treated hair a second portion of the selected hair from the hair area that is not marked with the first marker and that is not marked with the second marker;
    measuring a cross section of the post-treated hair;
    measuring a growth of the post-treated hair during the second duration of time comprising a length of the post-treated hair; and
  outputting the measured hair volume including the pre-treatment hair volume and the post-treatment hair volume.

2. The method of claim 1, wherein the second time point and the third time point occur at a same time.

3. The method of claim 1, wherein the first time duration and the second time duration are a same duration of time.

4. The method of claim 1, wherein the first time duration and the second time duration are greater than three weeks and less than six weeks.

5. The method of claims 1, wherein: the measured cross section of the pre-treated hair comprises a long axis and a short axis of the cross section of the pre-treated hair; and the measured cross section of the post-treated hair comprises a long axis and a short axis of the cross section of the post-treated hair.

6. The method of claim 5, wherein:
the measuring of the cross section of the pre-treated hair comprises measuring the long axis and the short axis of the pre-treated hair at a plurality of locations along the pre-treated hair;
the measuring of the pre-treatment hair volume further comprises calculating a hair volume of the pre-treated hair based on the length of the pre-treated hair and the long axis and the short axis measurements of the pre-treated hair;
the measuring of the cross section of the post-treated hair comprises measuring the long axis and the short axis of the post-treated hair at a plurality of locations along the pre-treated hair; and
the measuring of the post-treatment hair volume further comprises calculating a hair volume of the post-treated hair based on the length of the post-treated hair and the long axis and the short axis measurements of the post-treated hair.

7. The method of claim 1, wherein the first marker and the second marker are configured to alter a visual property of the hair.

8. The method of claim 7, wherein the first marker and the second marker are configured to alter a pigmentation of the hair or the first marker and the second marker are fluorescent markers.

9. The method of claim 1, wherein:
measuring the hair volume includes removing a strand of hair from the hair area; and
the removed strand of hair comprises the hair from the hair area.

10. The method of claim 1, wherein:
the measured pre-treatment hair volume includes a growth rate of the pre-treated hair comprising the length of the pre-treated hair divided by the first time duration; and
the measured post-treatment hair volume includes a growth rate of the post-treated hair comprising the length of the post-treated hair divided by the second time duration.

11. The method of claim 1, wherein the hair area comprises a scalp.

12. The method of claim 1, wherein the at least one of the first marker or the second marker is attached to a hair dye.

13. A method for evaluating hair growth treatments comprising:
receiving a hair sample, wherein:
  the hair sample was marked at a first time point using a first marker, such that the hair sample is detectably marked by the first marker;
  the hair sample was marked at a second time point using a second marker, such that the hair sample is detectably marked by the second marker;
wherein the second time point follows the first time point after a first duration of time;
  the hair sample was treated with a hair growth treatment at a third time point; and
  the hair sample was collected at a fourth time point following the second time point after a second duration of time;
measuring hair volume of the received hair sample comprising:
  measuring a pre-treatment hair volume of pre-treated hair comprising:
    detecting as the pre-treated hair a first portion of the hair sample that is marked with the second marker and that is not marked with the first marker;
    measuring a cross section of the pre-treated hair;
    measuring a growth of the pre-treated hair during the first duration of time comprising a length of the pre-treated hair;
  measuring a post-treatment hair volume of post-treated hair comprising:
    detecting as the post-treated hair a second portion of the hair sample that is not marked with the first marker and that is not marked with the second marker;
    measuring a cross section of the post-treated hair;
    measuring a growth of the post-treated hair during the second duration of time comprising a length of the post-treated hair; and
outputting the measured hair volume including the pre-treatment hair volume and the post-treatment hair volume.

14. The method of claim 13, wherein:
the measured pre-treatment hair volume includes a growth rate of the pre-treated hair comprising the length of the pre-treated hair divided by the first time duration; and the measured post-treatment hair volume includes a growth rate of the post-treated hair comprising the length of the post-treated hair divided by the second time duration.

15. The method of claim 13, wherein the second time point and the third time point occur at a same time.

16. The method of claim 13, wherein the first time duration and the second time duration are a same duration of time.

17. A hair measurement device for evaluating hair growth treatments comprising:
 a sample holder for receiving a hair sample, wherein:
  the hair sample was marked at a first time point using a first marker, such that the hair sample is detectably marked by the first marker;
  the hair sample was marked at a second time point using a second marker, such that the hair detectably marked by the second marker;
  the second time point follows the first time point after a first duration of time;
  the hair sample was treated with a hair growth treatment at a third time point; and
  the hair sample was collected at a fourth time point following the second time point after a second duration of time;
 a camera positioned to image the hair sample retained by the sample holder, wherein the camera is configured to:
  detect as the pre-treated hair a first portion of the hair sample that is marked with the second marker and that is not marked with the first marker;
  measure a growth of the pre-treated hair during the first duration of time comprising a length of the pre-treated hair;
  detect as the post-treated hair a second portion of the hair sample that is not marked with the first marker and that is not marked with the second marker; and
  measure a growth of the post-treated hair during the second duration of time comprising a length of the post-treated hair; and
 a width measurement device configured to:
  measure hair volume of the received hair sample comprising:
   measure as a pre-treatment hair volume a cross section of the pre-treated hair;
   measure as a post-treatment hair volume a cross section of the post-treated hair; and
  output the measured hair volume including the pre-treatment hair volume and the post-treatment hair volume.

18. The hair measurement device of claim 17, wherein the width measurement device comprises a laser width measuring device.

19. The hair measurement device of claim 17, wherein the camera is configured to act as the width measurement device.

20. The hair measurement device of claim 17, wherein the sample holder comprises a rotating screw configured to receive one end of the hair sample.

* * * * *